(12) United States Patent
Gaiardo

(10) Patent No.: US 7,857,283 B2
(45) Date of Patent: Dec. 28, 2010

(54) SOLENOID VALVE ASSEMBLY FOR A COMBUSTIBLE GAS SUPPLY DEVICE TO AN ENDOTHERMIC ENGINE

(75) Inventor: Mario Gaiardo, Ivrea (IT)

(73) Assignee: Matrix S.p.A., Corso Vercelli (IT)

( * ) Notice: Subject to any disclaimer, the term of this patent is extended or adjusted under 35 U.S.C. 154(b) by 159 days.

(21) Appl. No.: 11/915,058

(22) PCT Filed: May 19, 2006

(86) PCT No.: PCT/EP2006/062435

§ 371 (c)(1),
(2), (4) Date: Aug. 4, 2008

(87) PCT Pub. No.: WO2006/122975

PCT Pub. Date: Nov. 23, 2006

(65) Prior Publication Data

US 2008/0308051 A1    Dec. 18, 2008

(30) Foreign Application Priority Data

May 20, 2005    (IT)    ............................ TO2005A0348

(51) Int. Cl.
*F16K 31/06*    (2006.01)
(52) U.S. Cl. ................................ 251/129.16; 251/129.2
(58) Field of Classification Search ............ 251/129.16, 251/129.2, 129.17
See application file for complete search history.

(56) References Cited

U.S. PATENT DOCUMENTS

| | | | | |
|---|---|---|---|---|
| 4,390,130 A | * | 6/1983 | Linssen et al. | ............ 239/585.3 |
| 4,561,631 A | * | 12/1985 | Slavin et al. | .............. 251/129.2 |
| 4,610,425 A | * | 9/1986 | Kelly | ....................... 251/129.2 |
| 4,905,962 A | * | 3/1990 | Iljin | ....................... 251/129.16 |
| 5,040,567 A | * | 8/1991 | Nestler et al. | ........... 251/129.16 |
| 5,048,564 A | * | 9/1991 | Gaiardo | ................. 251/129.16 |
| 5,139,226 A | * | 8/1992 | Baldwin et al. | ........... 251/129.2 |

(Continued)

FOREIGN PATENT DOCUMENTS

EP    0 400 504 A1    12/1990

(Continued)

OTHER PUBLICATIONS

PCT International Search Report for PCT/EP2006/062435 dated Sep. 20, 2006.

*Primary Examiner*—John Bastianelli
(74) *Attorney, Agent, or Firm*—Dority & Manning, PA

(57) ABSTRACT

A solenoid valve assembly for a combustible gas supply device to an endothermic engine is disclosed. The solenoid valve assembly includes a solenoid valve with at least one combustible gas outlet and an armature controlled by an electromagnet, the armature having an armature plate and a shutter. The armature plate rotates about a contact line. The armature plate is engaged by a bar pushed against the plate by a spring so as to normally keep the shutter in closed position. The solenoid valve assembly includes a hollow body that may be connected to an intermediate plate that may be connected to a closing plate module. The closing plate module carries a variable number of outlet conduits. The intermediate plate is provided with a series of grooves adapted to accommodate a series of different gaskets, each gasket corresponding to a closing plate module.

18 Claims, 4 Drawing Sheets

U.S. PATENT DOCUMENTS

| | | | |
|---|---|---|---|
| 5,163,623 A * | 11/1992 | Seino | 239/585.3 |
| 5,653,422 A * | 8/1997 | Pieloth et al. | 251/129.2 |
| 5,762,097 A | 6/1998 | Hettinger et al. | |
| 6,700,232 B2 * | 3/2004 | Rieck et al. | 310/23 |
| 6,830,231 B2 * | 12/2004 | Paessler et al. | 251/64 |

FOREIGN PATENT DOCUMENTS

EP     1 267 065 A2    12/2002

* cited by examiner

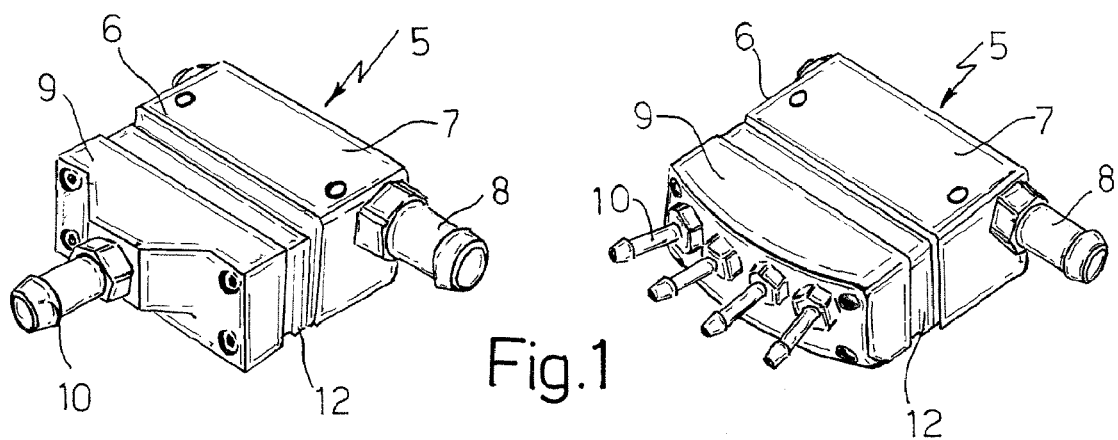

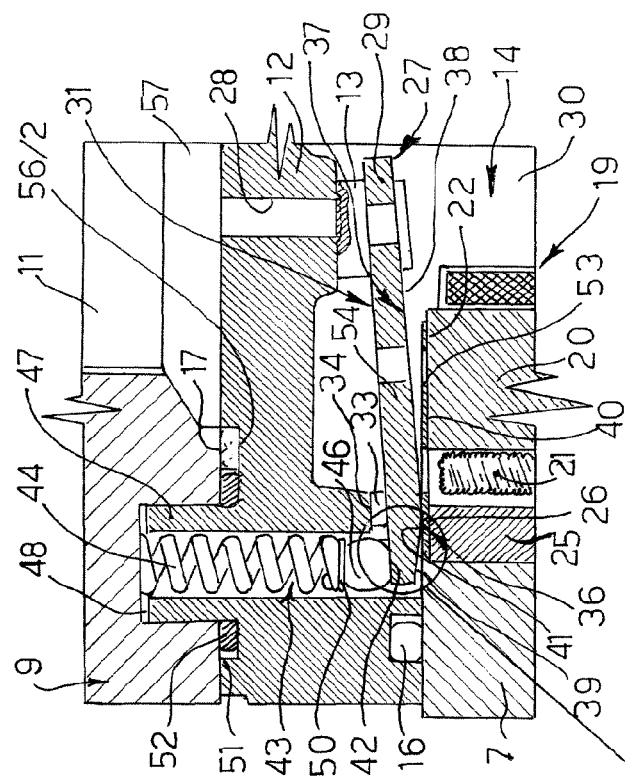
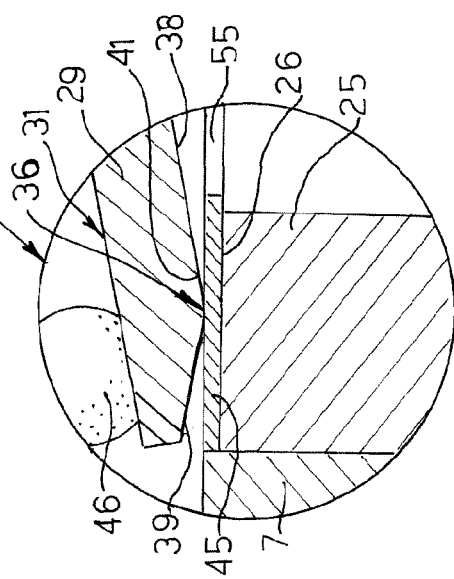
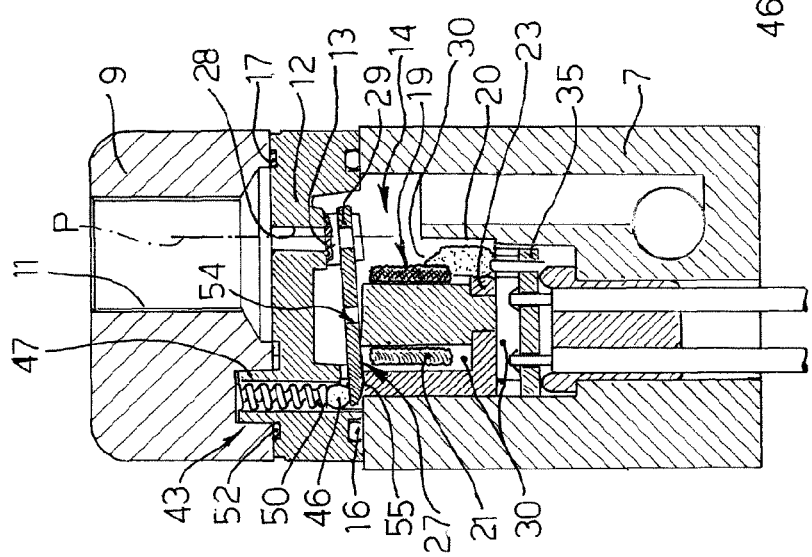
Fig. 4
Fig. 3

SOLENOID VALVE ASSEMBLY FOR A COMBUSTIBLE GAS SUPPLY DEVICE TO AN ENDOTHERMIC ENGINE

FIELD OF THE INVENTION

The present invention relates to a solenoid valve assembly for a combustible gas supply device to an endothermic engine, the solenoid valve assembly comprising at least one solenoid valve adapted to be controlled to send the combustible gas to a corresponding engine cylinder.

BACKGROUND OF THE INVENTION

There have been proposed different combustible gas supply systems to an engine. In a known system, the gas output by a reducer-vaporiser is sent to a distributor-metering unit connected to the intake conduits of the various cylinders by way of respective conduits. The combustible gas is sent to the intake conduit of each cylinder by a solenoid valve assembly in which the shutter of each solenoid valve is carried by an armature of an electromagnet. The armature of the electromagnet is formed by an oblong plate that rotates about a contact line with one edge of a fixed element. Such contact is ensured by a bar of elastic material acting on one end of the armature. The armature, however, is held in closed position by a spring acting at the shutter.

These solenoid valves present some functional limits. First, the position of the contact line on the armature may vary due to the machining and assembly tolerance of the parts. Furthermore, the presence of the solenoid valve closing spring makes the operation of the latter relatively slow. Finally, the manufacturing of the solenoid valve is relatively costly, and the assembly and maintenance are particularly complicated.

A solenoid valve assembly for a combustible gas supply device comprising a solenoid valve having a shutter carried by a plate turnable about a contact line with a fixed element has also been proposed. This contact line consists of an edge formed by a slanted plane portion on a face of the plate, which is held in closed position by a bar of elastic material acting at the slanted plane portion. To maximize the amount of gas supplied, two selectively operable different solenoid valves are envisaged for each cylinder of the engine.

This solenoid valve assembly, in the case of an oily fluid such as LPG type gas, presents the drawback that the oil becomes very viscous at low temperatures, for example at −40° C. As a consequence, the gas supply of this assembly becomes problematic. Furthermore, at low temperatures, the elastic features of the returning bar are reduced, causing the armature to be returned to closed position with great delay. The elastic bar provides in all cases a non constant force for the detachment of the armature from the polar surface of the electromagnet core at various temperatures of use. Finally, the presence of two solenoid valves for each engine cylinder makes the device cumbersome and costly.

SUMMARY OF THE INVENTION

It is an object of the invention to obtain a solenoid valve assembly for a combustible gas supply device resulting in high reliability and low cost, eliminating the drawbacks of the solenoid valve assemblies of the known art. Additional objects and advantages of the invention will be set forth in the following description, or may be obvious from the description, or may be learned through practice of the invention.

These objects are achieved by a solenoid valve assembly for a combustible gas supply device to an endothermic engine according to the present invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 depicts a perspective view of two solenoid valve assemblies according to two different embodiments of the invention;

FIG. 2 depicts a longitudinal section of another embodiment of the solenoid valve assembly according to the invention;

FIG. 3 depicts a cross-sectional view taken along line in FIG. 2;

FIG. 4 depicts a portion of the section shown in FIG. 3 on a magnified scale;

DETAILED DESCRIPTION OF THE DRAWINGS

Figure 5:
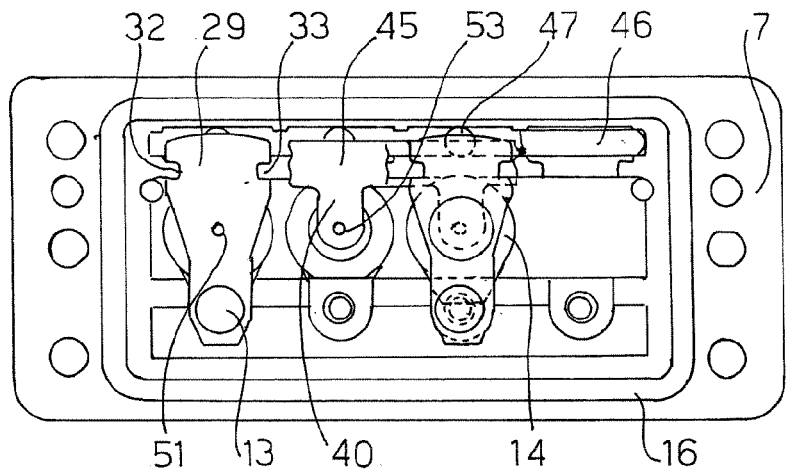
FIG. 5 depicts a cross-sectional view taken along line V-V in FIG. 2.

Reference is now made to embodiments of the invention, examples of which are illustrated in the drawings.

With reference to FIG. 1, numeral 5 generically indicates a solenoid valve assembly according to two different embodiments of the invention for a combustible gas supply device to an endothermic engine, for example an Otto cycle. The combustible gas may be methane or LPG. The assembly 5 is enclosed in a box 6 essentially shaped as a parallelepiped, which comprises a hollow body 7 (also see FIG. 2), on which an inlet union 8 is fastened in a known manner for connection to a rigid or flexible gas inlet conduit not shown in the drawings.

The box 6 also comprises a plate 9 for closing the hollow body 7 that supports a number of nozzles or outlet unions 10 for as many rigid or flexible outlet conduits not shown. Each of these outlet conduits is connected in a known manner to a corresponding engine cylinder. As shown in FIG. 1, one of the embodiments of the plate 9 carries only one outlet union 10, while in the other embodiment the plate 9 carries four outlet unions 10. In FIG. 2, the plate 9 carries two outlet unions 10. In any case, the outlet unions 10 are calibrated and interchangeable and are gas-tightly removably fastened, for example screwed, onto corresponding threaded pipes 11 made on the plate 9.

The box 6 also comprises a spacer or intermediate plate 12 supporting a plurality of shutters 13 for as many solenoid valves 14. Each solenoid valve 14 is associated to corresponding holes or outlets 28 of plate 12. The holes or outlets 28 are reciprocally equal and parallel and present respective axes arranged on a longitudinal median plane P (also see FIG. 3) perpendicular to plate 12. This plate is fastened to the hollow body 7 by means of screws 15, with the interposition of a gasket 16. In turn, the closing plate 9 is fastened to the intermediate plate 12 with the interposition of gaskets 17 (which will be better seen below) by means of other screws 18 that are fastened in corresponding threaded holes of the hollow body 7.

Figure 6:
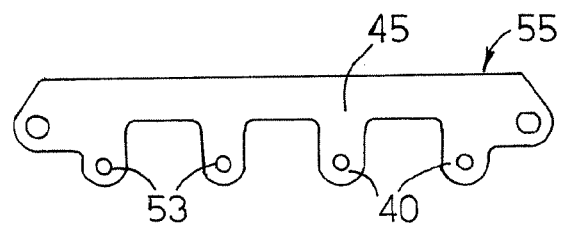
FIGS. 6 and 7 depict a view of two details of the solenoid valve assembly in FIG. 2.
Figure 7:
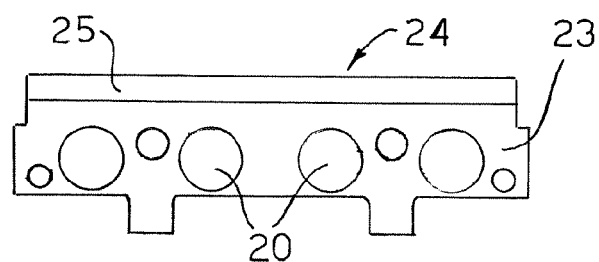

In particular, each solenoid valve 14 comprises a control electromagnet 19 (FIGS. 3 and 4) comprising a core 20 of magnetic material and an electrical coil 21. The core 20 presents a polar surface 22, and is fastened onto a bottom wall 23 of profile 24 (also see FIG. 7). The profile 24 is also of magnetic material and completes the magnetic circuit of the electromagnets 19. The profile 24 is common to all cores 18 and is accommodated in a compartment 36 of the hollow body 7 in communication with the inlet union 8. The profile 24 also presents a side wall 25 having a polar surface 26. The polar surface is flat and aligned with the polar surface 22 of the core 20. A gap plate 55 (also see FIG. 6) comprises a strip 45 adapted to cover the surface 26 of the wall 25 and a series of appendixes or tabs 40 adapted to cover the polar surfaces 22 of the cores 20.

Each shutter 13 is in the form of an elastomeric material disc and is adapted to close the corresponding hole or outlet 28 of the intermediate plate 12. Each shutter 13 is carried in a known manner by a corresponding armature 27 of the respective electromagnet 19, which is formed by a plate 29 of magnetic material. The armature plate 29 has an oblong shape and presents a face 31 consisting of a flat surface, from which the shutter 13 protrudes towards the hole 28. The armature plate 29 is provided with a pair of lateral recesses 32 (FIG. 5) which are adapted to engage two appendixes 33 carried by a rib 34 of the intermediate plate 12. The plate 12 has the function of guiding the armatures 27. To the wall 25 (FIG. 3) of the profile 24 is anchored the usual printed control circuit 35 of the solenoid valves 14 which is therefore accommodated in the compartment 36 of the hollow body 7. Furthermore, the printed circuit 35 is connected by electrical wires 49 having a single connection with the outside. In particular, the wires 49 supply electrical power to the electromagnets 19 and are enclosed in a single sheath 59 inserted in an aperture 60 of the hollow body 7.

The plate 29 is turnable about a contact line 36 arranged on a face 37 of the plate 29 opposite to face 31. The contact line 36, through the strip 45 of gap 55, rests on the surface 26 of the side wall 25 of the profile 24. The face 37 comprises a flat surface 38 parallel to that of the face 31, a slanted surface 39, and a strip 41 formed by a curved surface. The strip 41 comprises the contact line 36 and is arranged between the two flat surfaces 38 and 39. Preferably, the dihedral angle between the two surfaces 38 and 39 is smaller than 20°. An elastic element acts on a portion 42 of the face 31 opposite to the slanted surface 39 of the face 37. This portion is generally indicated by 43 and is adapted to normally keep the shutter 13 in closed position of the hole 28 of the intermediate plate 12.

According to one exemplary embodiment of the invention, the elastic element 43 comprises a helical compression spring 44, which by means of a rigid compensation plate 50 acts on a bar 46 of relatively elastic material common to all armatures 27. In particular, to accommodate each spring 44, the intermediate plate 12 is provided with a corresponding sleeve 47 (also see FIG. 4) engaging a corresponding compartment 48 of the closing plate 9 against whose bottom the spring 44 abuts. At each sleeve 47, the intermediate plate 23 presents a circular groove 51 in which a corresponding gas tight gasket 52 is accommodated.

Advantageously, the bar 46 presents a section having a circular portion engaging the portion 42 and a flat portion engaging the compensation plate 50. The bar 46 consists of a fluoridated elastomer having a permanently non alterable reticular structure in a temperature range from −40° C. to +180° C. Therefore, the bar 46 ensures in such temperature range a friction reduction between an elastic element 43 and the plate 29, thus extending the life of the solenoid valve 14.

Preferably, the gap plate 55 has a reduced thickness, for example from 0.015 mm to 0.15 mm. Each fin or tab 40 of the gap plate 55 (also see FIG. 6) is provided with a hole 53 for the purpose of increasing drainage of oily fluids contained in LPG combustible gas. For the same reason, each plate 29 is provided with a hole 54. In turn, the coil 21 is sized so as to absorb during the maintenance step a power from 1.3 to 1.5 watts. Advantageously, the coil 21 may be sized so as to absorb a maintenance current of 0.6 amperes and an equivalent power of 1.44 watts.

Experiments show that the solenoid valve 14 according to exemplary embodiments of the invention present an opening and closing time of the shutter 13 lower than 0.6 ms with a fluctuation of such times lower than the measurable threshold. The maximum injection frequency is higher than 160 hertz with an average life of the solenoid valve 14 in the order of 500 million operating cycles. In normal conditions of use, the repeatability of these results remains constant in a range of temperatures from −40° to +120°.

According to another aspect of the invention, the closing plate 9 is fitted in an easily removable manner and is of the modular type, i.e. provided with a different number of conduits or channels 11. For this purpose, the intermediate plate 12 is provided with a set of grooves indicated as a whole by 56. The grooves are adapted to accommodate corresponding gas-tight gaskets 17 for allowing the connection to different closing plate modules 9.

Figure 8:
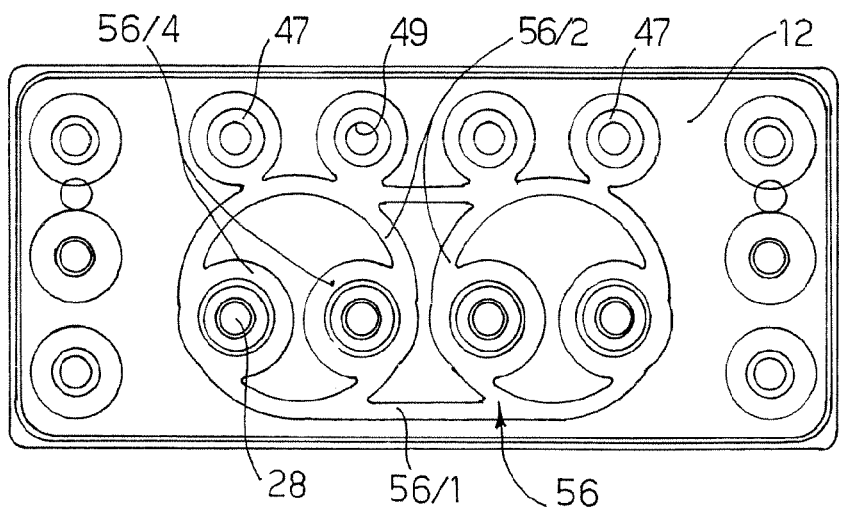
FIG. 8 depicts a cross-sectional view taken along line VIII-VIII of the solenoid valve assembly in FIG. 2.

FIG. 2 shows a plate 9 provided with two conduits or channels 11, each of which terminates with an intermediate chamber formed by a flared portion 57 of the conduit or channel 11 so as to be in communication with two outlets 28 of the intermediate plate 12. In this manner, each output union 10 can receive the supplied combustible gas through one or two holes or outlets 28 of the closing plate 9 operating one or both the respective solenoid valves 14. The connection of the closing plate 9 on the intermediate plate 12 is made using two gaskets 17, each of which is arranged in a groove 56/2 (FIG. 8) which surrounds the outlet of two holes 28 of the intermediate plate 12.

Figure 9:
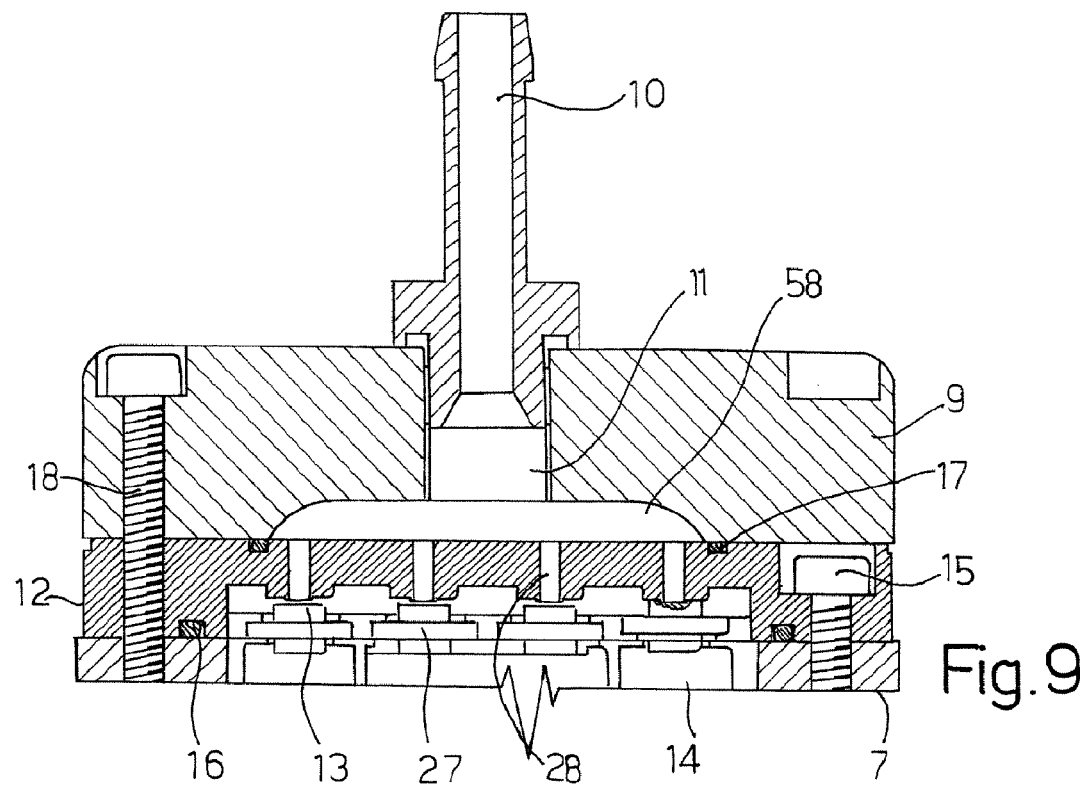
FIG. 9 depicts a partial longitudinal section of one of the embodiments of the solenoid valve assembly of FIG. 1.

In the embodiment shown in FIG. 9, which depicts a section of one of the embodiments of FIG. 1, a closing plate 9 is provided with a single conduit 11 for a corresponding outlet union 10. The single conduit 11 is in communication with an intermediate chamber 58 adapted to receive the combustible gas. This is supplied through a number of holes or outlets 28, variable from one to four, operating the corresponding solenoid valves 14. The connection of the closing plate 9 on the intermediate plate 12 is performed with the use of gasket 17 arranged in a groove 56/1 (FIG. 8) which surrounds the outlet of the four holes or outlets 28 of the intermediate plate 12.

In the embodiments of FIG. 2 and FIG. 9, the holes or outlets 28 in communication with the outlet union 10 can be controlled selectively, i.e. individually or in combination, so as to modularly vary the flow rate of combustible gas to be supplied to the respective engine cylinder. Furthermore, the holes 28 in communication with a predetermined outlet union 10 can be variably controlled during the supply step of a cylinder so as to modulate the combustible gas supply according to a predetermined diagram.

Figure 10:
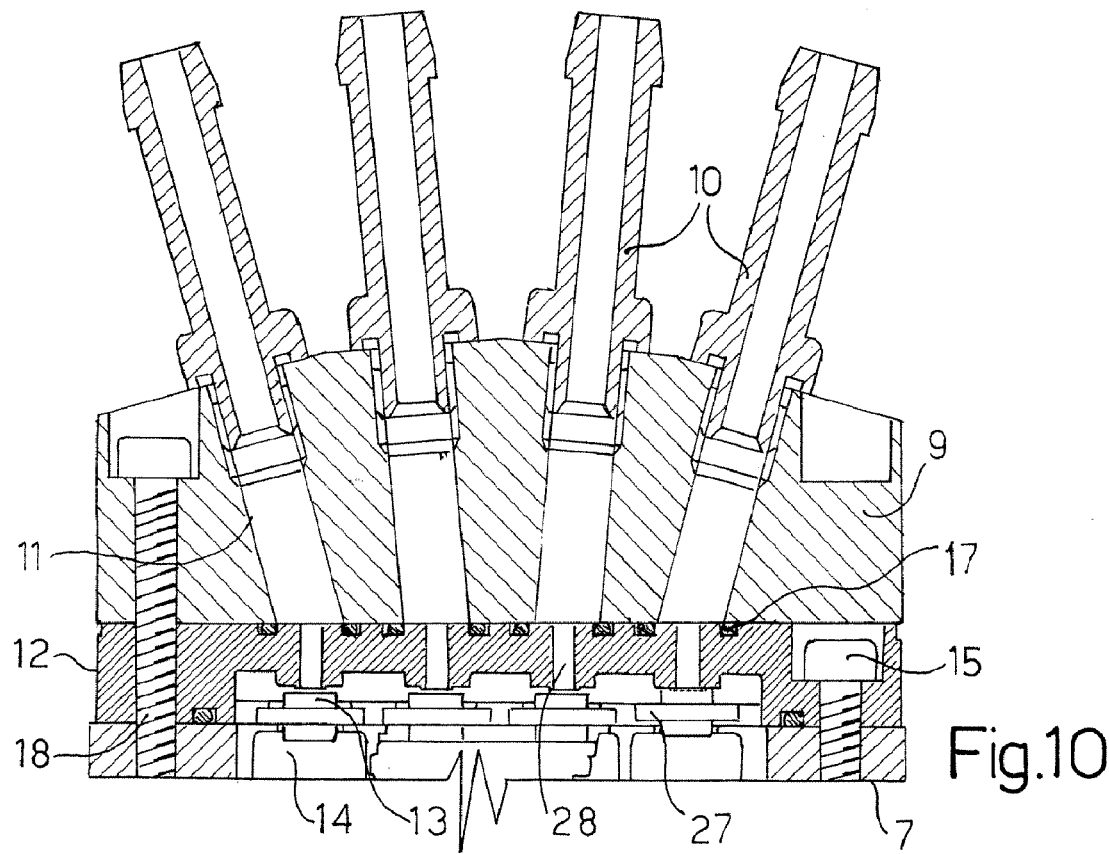
FIG. 10 is a partial longitudinal section of the other embodiment of the solenoid valve assembly in FIG. 1.

In the embodiment of FIG. 10, which represents a section of the other embodiment of FIG. 1, a closing plate 9 equipped with four conduits or channels 11 for as many outlet unions 10 is shown. Each hole or outlet 28 supplies a corresponding outlet union 10 under the control of the respective solenoid valve 14. The connection of the closing plate 9 on the intermediate plate 12 is performed with the use of four gaskets 17, each of which is arranged in a groove 56/4 (FIG. 8) that surrounds the outlet of a corresponding hole or outlet 28 of the intermediate plate 12.

As shown in FIG. 10, the conduits or channels 11 preferably are coplanar. For the purpose of facilitating access to the outlet unions 10, and therefore to the connection with the respective connection conduits to the engine cylinders, the conduits 11 have an outwardly diverging shape in which the ends of the unions 10 are more distanced.

It is therefore clear that with the embodiments of FIGS. 2, 9 and 10 of the assembly 5 of solenoid valves 14, it is possible to obtain flow rates of gas towards each engine cylinder from 905 Nl/min (standard liters per minute) at the pressure of 1 bar in the case of FIG. 10 to a maximum of 365 Nl/min in the case of FIG. 9. Furthermore, by replacing the single closing plate 9, the same assembly 5 of solenoid valves 14 may be used in different applications requiring the gas supply through different number of output unions 10. Furthermore the production, storage and management of solenoid valve assemblies 5 are optimized, specifically for OEM production.

From the above, it is apparent that there are various other advantages of the assembly 5 of solenoid valves 14 according to the present invention. In particular, the assembly 5 of solenoid valves 14 is of reduced dimensions and weight, thereby allowing more freedom of accommodation in the engine compartment of a motor vehicle. Furthermore, the assembly 5 has a higher reliability because the number of active components have been essentially halved, i.e-. the number of electromagnets 19 and the respective armatures 27. The response time of the electromagnets 19 is also reduced thanks to the sizing of the gap plate 55 and of the coil 21. Thanks to the increased compatibility of solenoid valves 14 of the oily fluids associated with LPG gas, the response time is constant at temperatures from −40° C. and +120° C. Finally, due to the modular plates 9, the apparatus has high application flexibility for flows up to 365 Nl/min at a pressure of 1 bar.

It is understood that various modifications and improvements may be made to the solenoid valve assembly without departing from the scope of the present invention. For example, the holes or outlets 28 of the plate 12 may be differently arranged. In the embodiment of FIG. 10, the conduits 11 may be reciprocally parallel and coherently arranged with the holes or outlets 28 of the plate 12. Furthermore, both the bar 46 and the compensation plate 50 may be divided into individual segments for each armature 27. The plate 50 may also be provided with narrowing sections to reduce the influence of the shift of an armature 27 on the adjacent armatures 27.

Finally, both the dimensions and the shape of the box 6 may be changed. For example, in FIG. 9 the closing plate 9 may have a shape such to allow a tapered intermediate chamber 58 so as to guarantee that the flow of gas from the conduits 28 is conveyed to the inlet of the single conduit 11 with minimum loss of load.

While the present subject matter has been described with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

The invention claimed is:

1. A solenoid valve assembly for a combustible gas supply device to an endothermic engine, the solenoid valve assembly comprising:
    a solenoid valve comprising
        an electromagnet,
        an outlet for the combustible gas, and
        an armature controlled by the electromagnet, the armature comprising an armature plate and a shutter connected to the armature plate, the shutter movable between an open position to allow the flow of combustible gas into the outlet and a closed position to prevent the flow of combustible gas into the outlet, the shutter being located in the open position when the armature is activated by the electromagnet, the armature plate rotatable about a contact line against the surface of a fixed element; and
    an elastic element acting on the armature plate to keep the shutter in the closed position when the armature is not activated by the electromagnet, the elastic element comprising a member pushed against the armature plate by a spring, the elastic element further comprising a compensation plate located between the spring and the member, the member defining a curved portion that engages the armature plate and a flat portion that engages the compensation plate.

2. The solenoid valve assembly of claim 1, wherein the contact line is located between a first surface of the armature plate and a second surface of the armature plate, the second surface of the armature plate being slanted with respect to the first surface of the armature plate.

3. The solenoid valve assembly of claim 1, wherein the spring is a helical compression spring.

4. The solenoid valve assembly of claim 1, wherein the bar is formed from an elastomer.

5. The solenoid valve assembly of claim 1, wherein the fixed element comprises a gap plate that completes the magnetic circuit of the electromagnet.

6. The solenoid valve assembly of claim 5, wherein the gap plate further comprises a plurality of tabs, each of the tabs engaging a core of an electromagnet, the tabs further comprising holes to facilitate the draining of oily components of the combustible gas.

7. The solenoid valve assembly of claim 5, wherein the gap plate has a thickness from 0.015 mm to 0.15 mm.

8. The solenoid valve assembly of claim 1, wherein the solenoid valve assembly further comprises an outlet union in communication with the outlet, the flow of combustible gas from the outlet into the outlet union being controlled by the solenoid valve.

9. The solenoid valve assembly of claim 8, wherein the engine comprises a plurality of cylinders, each cylinder of the engine being supplied by an outlet conduit in communication with the outlet union.

10. The solenoid valve assembly of claim 9, wherein the armature of the solenoid valve is controlled to modulate the flow of the combustible gas into the engine cylinders.

11. The solenoid valve assembly of claim 10, wherein the armature of the solenoid valve is controlled to modulate the flow of the combustible gas to the engine cylinders according to a predetermined diagram.

12. The solenoid valve assembly of claim 1, wherein solenoid valve assembly comprises a hollow body, the hollow body being connected to a closing plate, the closing plate comprising an outlet union.

13. The solenoid valve assembly of claim 12, wherein the solenoid valve assembly further comprises an intermediate plate between the hollow body and the closing plate, the intermediate plate comprising the outlet of the solenoid valve.

14. The solenoid valve assembly of claim 12, wherein the closing plate is a closing plate module having an outlet channel.

15. The solenoid valve assembly of claim 14, wherein the intermediate plate comprises a plurality of grooves, each of the grooves being configured to receive one of a plurality of gaskets, each gasket corresponding to a closing plate module.

16. The solenoid valve assembly of claim 14, wherein the closing plate module comprises a plurality of coplanar and parallel outlet channels.

17. The solenoid valve assembly of claim 14, wherein the closing plate module comprises a plurality of coplanar and divergent outlet channels.

18. The solenoid valve assembly of claim 1, wherein the electromagnet is controlled by a printed circuit located inside the solenoid valve assembly, the printed circuit having a wiring with a single connection located outside the solenoid valve assembly.

* * * * *